United States Patent [19]

Takizawa

[11] Patent Number: 5,054,336
[45] Date of Patent: Oct. 8, 1991

[54] SHIFT CONTROL FOR AUTOMATIC TRANSMISSION FOR EFFECTIVE ENGINE BRAKE RUNNING

[75] Inventor: Satoshi Takizawa, Yokosuka, Japan

[73] Assignee: Nissan Motor Co., Ltd., Yokohama, Japan

[21] Appl. No.: 342,144

[22] Filed: Apr. 24, 1989

[30] Foreign Application Priority Data

Apr. 22, 1988 [JP] Japan .................. 63-98386

[51] Int. Cl.$^5$ .............. F16H 59/48; F16H 59/68; F16H 59/36

[52] U.S. Cl. .................. 74/866; 364/424.1; 192/9 A

[58] Field of Search ............ 74/856, 859, 860, 861, 74/866, 869, 846; 192/4 A

[56] References Cited

U.S. PATENT DOCUMENTS 4,680,992 7/1987 Hayasaki et al. ............ 74/869
4,829,435 5/1989 Isono .................. 74/866 X

FOREIGN PATENT DOCUMENTS

3513778 10/1986 Fed. Rep. of Germany ........ 74/866
49008 8/1980 Japan .................. 74/866
56-39349 4/1981 Japan .................. 74/866
0147949 11/1981 Japan .................. 74/866
0211061 12/1983 Japan .................. 74/866
61-65950 4/1986 Japan .................. 74/866
0079053 4/1986 Japan .................. 74/866
62-28556 2/1987 Japan .................. 74/866
0031751 2/1987 Japan .................. 74/869
197810 10/1978 United Kingdom .......... 74/866

Primary Examiner—Allan D. Herrmann
Assistant Examiner—Khoi A. Ta
Attorney, Agent, or Firm—Foley & Lardner

[57] ABSTRACT

An automatic transmission for an automotive vehicle is disclosed wherein a shift in gear position is controlled such that a new gear position which the automatic transmission should be conditioned in is determined in response to deceleration which the automotive vehicle is subject to and a present gear position which the automatic transmission is conditioned in, and a downshift is effected in the automatic transmission from the present gear position down to the new gear position. As a result, engine brake running fit to the driver's demand is produced.

9 Claims, 9 Drawing Sheets

SHIFT CONTROL FOR AUTOMATIC TRANSMISSION FOR EFFECTIVE ENGINE BRAKE RUNNING

RELATED APPLICATION

U.S. patent application Ser. No. 07/336,431, filed on Apr. 11, 1989 by the same applicant claiming priority on Japanese Patent Applications Nos. 63-87390 and 63-87391.

BACKGROUND OF THE INVENTION

The present invention relates to a system for and a method of controlling shifting in gear position in an automatic transmission, and more particularly to a system for and a method of controlling shifting in gear position in an automatic transmission when an automotive vehicle which the automatic transmission is mounted on is subject to deceleration.

An automatic transmission of the E4N71B type is known. This automatic transmission is manufactured by Nissan Motor Company Limited in Japan and described in a publication "NISSAN AUTOMATIC TRANSMISSION L4N71B TYPE, E4N71B TYPE, SERVICE MANUAL 1982 (A261C04)" issued by Nissan Motor Company Limited on November in 1982. This known transmission comprises a downshift solenoid, a shift switch, an idle switch, a vehicle speed sensor, a brake switch, and a control unit. As described on page 12 of the above-mentioned publication, the downshift solenoid is rendered ON when the shift switch indicates that the third gear position is established in D range, the vehicle speed sensor detects a vehicle speed falling in a predetermined range from 30 km/h to 50 km/h, the brake switch is rendered ON, and the idle contacts of the throttle switch are rendered ON. According to this known downshift control, whenever the above mentioned conditions are met, a downshift is made to the adjacent one low gear position, and further downshift will not be made. Thus, if more effective engine brake is needed, it is necessary to shift a manual selector to a manual select range position, such as "2" range or "1" range.

An object of the present invention is to provide a shift control for an automatic transmission for an automotive vehicle wherein, when the vehicle is being braked, a downshift is made in response to a gear position currently used and the amount of deceleration which the vehicle is subject to.

A specific object of the present invention is to provide a shift control for an automatic transmission for an automotive vehicle wherein, when the vehicle is subject to deceleration, a downshift is made to a gear position lower than usual when the absolute magnitude of deceleration is great.

SUMMARY OF THE INVENTION

According to the present invention, there is provided, in an automatic transmission for an automotive vehicle, a shift control comprising:

means for determining a new gear position which the automatic transmission should be conditioned in in response to a magnitude of deceleration which the automotive vehicle is subject to and a present gear position which the automatic transmission is conditioned in; and means for effecting a downshift in the automatic transmission from said present gear position down to said new gear position.

According to a specific aspect of the present invention, there is provided, in an automatic transmission for an automotive vehicle, the automatic transmission being shiftable from a predetermined gear position down to an adjacent low gear position or down to a still lower gear position lower than the adjacent gear position, a shift control comprising:

means for setting as a new gear position which the automatic transmission should be conditioned in the still lower gear position when the automatic transmission is conditioned in the predetermined gear position and the absolute magnitude of deceleration which the automotive vehicle is subject to is greater than or equal to a first predetermined value, said setting means being operative to set as said new gear position the adjacent low gear position when the automatic transmission is conditioned in the predetermined gear position and the magnitude of deceleration which the automotive vehicle is subject to is less than said first predetermined value but greater than or equal to a second predetermined value that is less than said first predetermined value; and means for effecting a downshift in the automatic transmission from the predetermined gear position down to said new gear position.

According to another aspect of the present invention, there is provided, in an automatic transmission for an automotive vehicle, a method of controlling a shift in gear position in the automatic transmission, comprising the steps of: determining a new gear position which the automatic transmission should be conditioned in in response to a magnitude of deceleration which the automotive vehicle is subject to and a present gear position which the automatic transmission is conditioned in; and effecting a downshift in the automatic transmission from said present gear position down to said new gear position.

BRIEF DESCRIPTION OF THE DRAWINGS

FIG. 4b is a flow chart of a program for determining a deceleration which an automotive vehicle is subject to;

FIG. 5 is a flow chart of a program for setting a downshift flag indicative of a new gear position which the automatic transmission should be conditioned in;

DETAILED DESCRIPTION OF THE INVENTION

Figure 1:
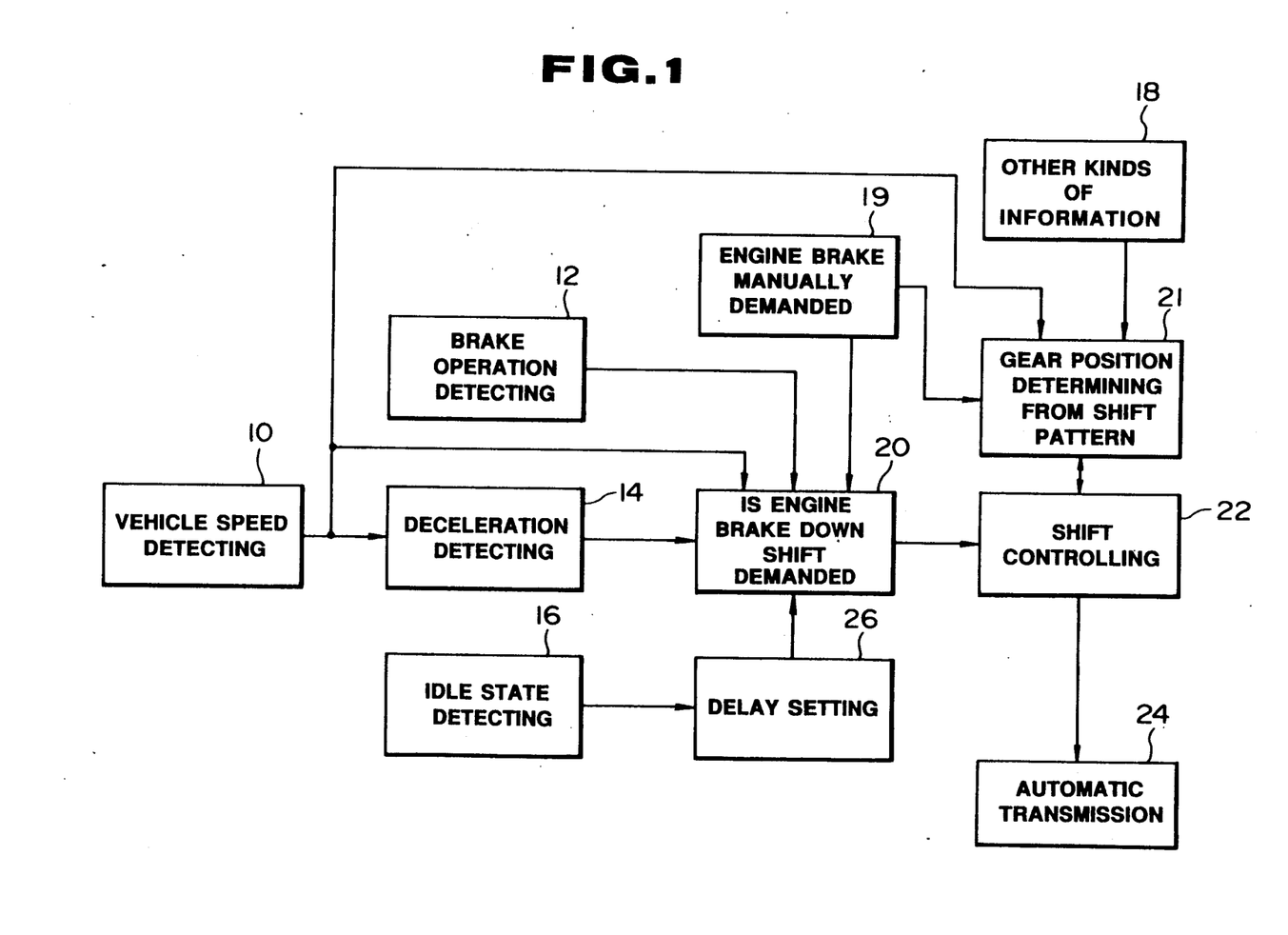
FIG. 1 is a functional block diagram of a first embodiment according to the present invention.

Referring to FIG. 1, there is shown a functional block diagram of an embodiment of a system for controlling shifting in gear position in an automatic transmission. A vehicle speed detecting block 10 which counts the occurrences of a pulse generated by a vehicle speed sensor for a predetermined period of time (for example, 100 ms or 354 ms) and generates the result as a vehicle speed indicative signal. The vehicle speed sensor is provided on an output shaft of an automatic transmission 24. A brake operation detecting block 12 is provided where a brake signal generated by a brake switch is detected and it is determined whether the brake is operated or not. A deceleration detecting block 14 is provided where a derivative with respect to time, of the vehicle speed indicative signal from the vehicle speed detecting block 10 during a predetermined period of time is calculated and the result is outputted as a deceleration indicative signal. Alternatively, the deceleration which the vehicle is subject to can be directly given by a deceleration sensor mounted to measure the longitudinal deceleration which the vehicle is subject to. An idle state detecting block 16 is provided where an output signal of an idle switch is detected and it is determined whether the engine throttle valve is at the idle speed position or not. The idle switch is arranged within the engine throttle chamber. A block 18 is provided where the other kinds of information, such as a throttle opening degree and an oil temperature of oil used in the automatic transmission, which are necessary for the shifting control are detected and generated as output signals. A block 19 is provided where it is determined whether an engine brake running is demanded or not. More specifically, it is detected at the block 19 whether a selector of a manual valve is placed at a manual "2" range or "1" range position or an overdrive (OD) switch is pressed. When the OD switch is pressed, an upshift to the overdrive fourth gear position is inhibited. The output signal of the block 19 is fed to a block 20.

The block 20 is provided for determining whether there is any demand for engine brake downshift and a new gear position which the automatic transmission should be shifted down to. Fed to this block 20 are the vehicle speed indicative signal from the block 10, the brake operation indicative signal from the block 12, the idle operation indicative signal from a block 26 accompanied by a delay, and the output signal from the block 19. At the block 20, it is determined whether predetermined conditions are met for effecting downshifting for an engine brake running or not and a new gear position is determined which the automatic transmission should be shifted down to. The output of the block 20 indicative of the result is fed to a shift controlling block 22.

The outputs of the blocks 10, 18 and 19 are fed to a block 21 where a desired gear position which the automatic transmission should be conditioned in is determined by table look-up operation of shift pattern table in a conventional manner. For example, an appropriate shift pattern table for engine brake running is selected and set for use when the output of the block 19 indicates that the selector is placed at the manual "2" or "1" range position. An output of the block 21 indicative of the desired gear position is fed to the shift controlling block 22.

The shift controlling block 22 controls shifting in gear position in the automatic transmission 24 in a conventional manner in the absence of the output signal from the block 20 indicative of the fact that the predetermined conditions for effecting downshifting for engine brake running are met. However, upon receipt of the output signal from the block 20 indicative of the fact that the predetermined conditions for effecting downshifting for engine brake running are met, the shift controlling block 22 commands downshifting and engaging of a clutch for effecting engine brake running, namely an overrunning clutch in the case of the automatic transmission used herein.

In this embodiment, the automatic transmission 24 is of the RE4R01A type described in "NISSAN FULL-RANGE AUTOMATIC TRANSMISSION RE4R-01A TYPE, SERVICE MANUAL, (A261C07)" issued on March, 1987 by NISSAN MOTOR COMPANY LIMITED. The automatic transmission of the above mentioned type is also disclosed in the before mentioned U.S. Pat. No. 4,680,992 (Hayasaki et al.) which is hereby incorporated in its entirety by reference.

Referring to FIGS. 2A, 2B, 2C, and 3, the automatic transmission 24 is briefly described.

Figure 2A:
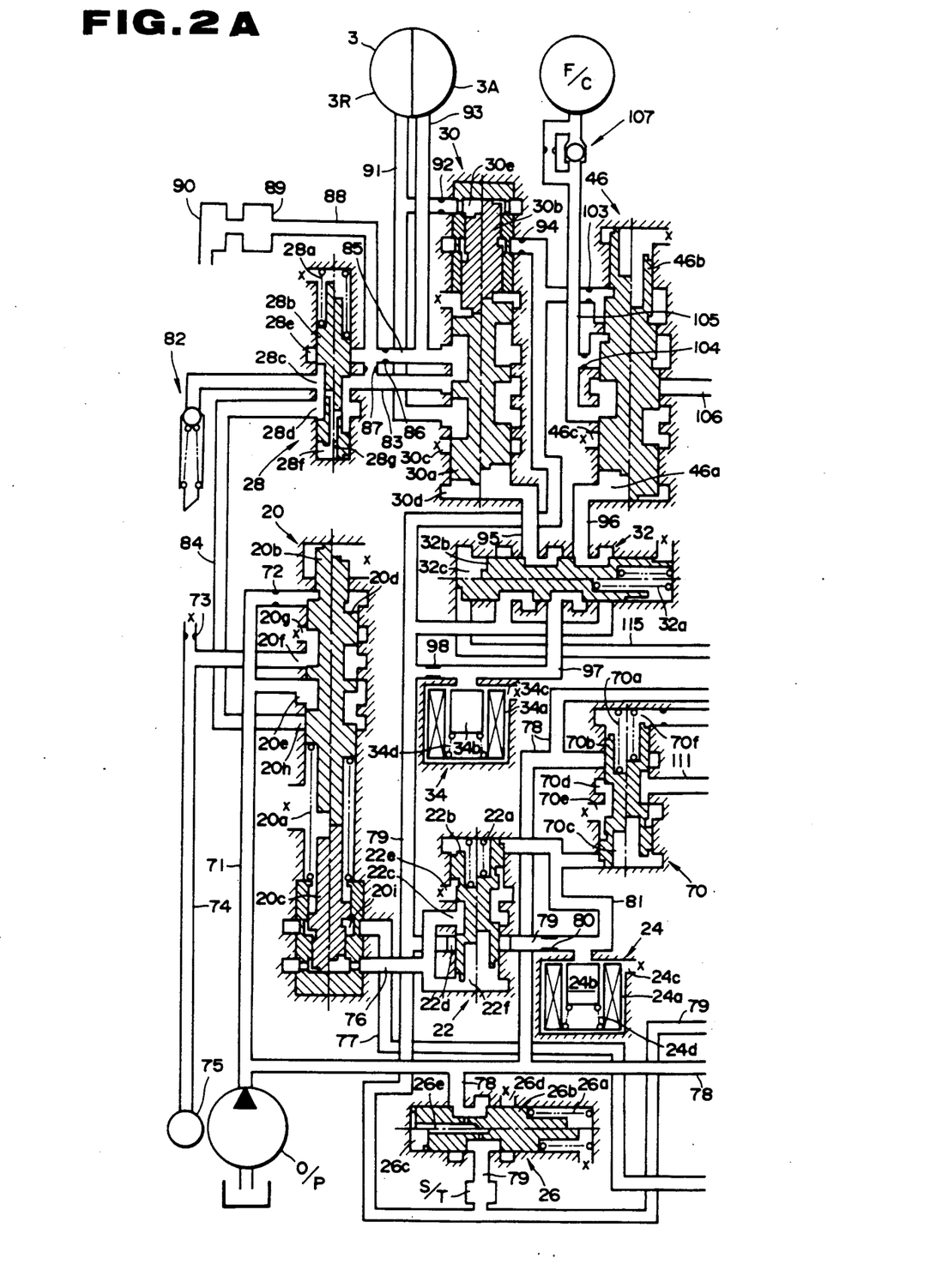
FIGS. 2A, 2B, and 2C when combined side by side, illustrate an electro-hydraulic control system for the automatic transmission shown in FIG. 1.
Figure 2B:
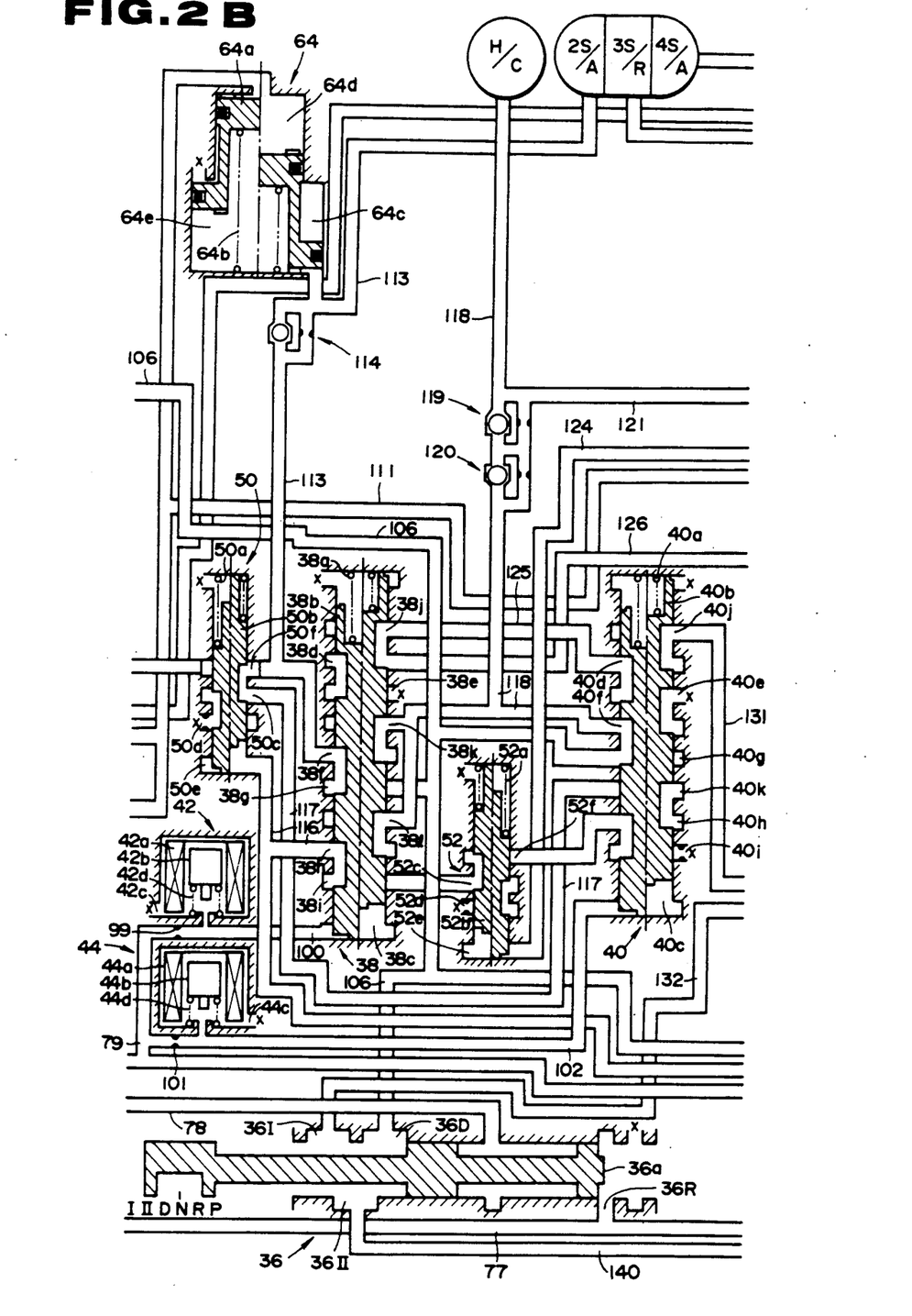
Figure 2C:
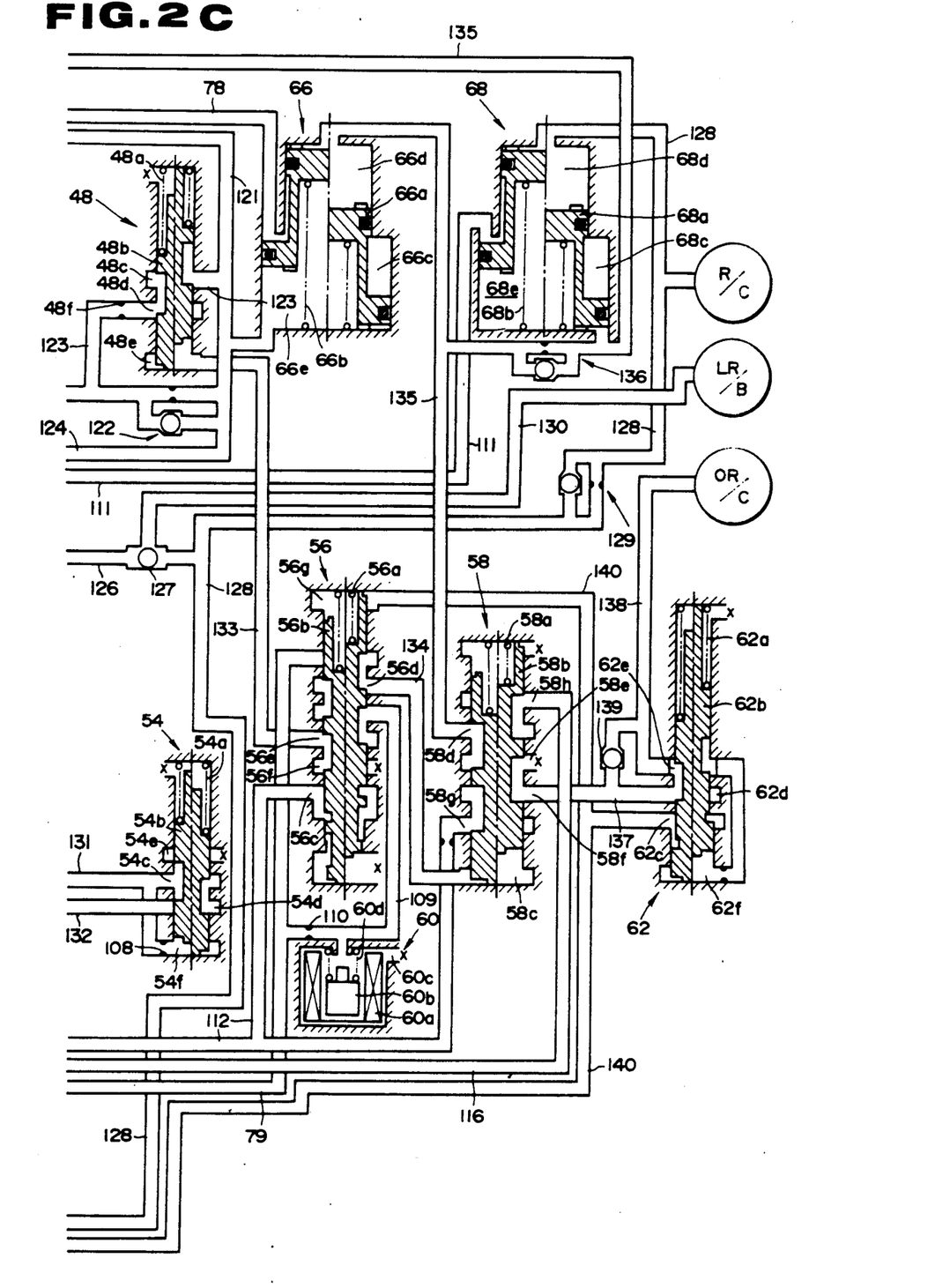
Figure 3:
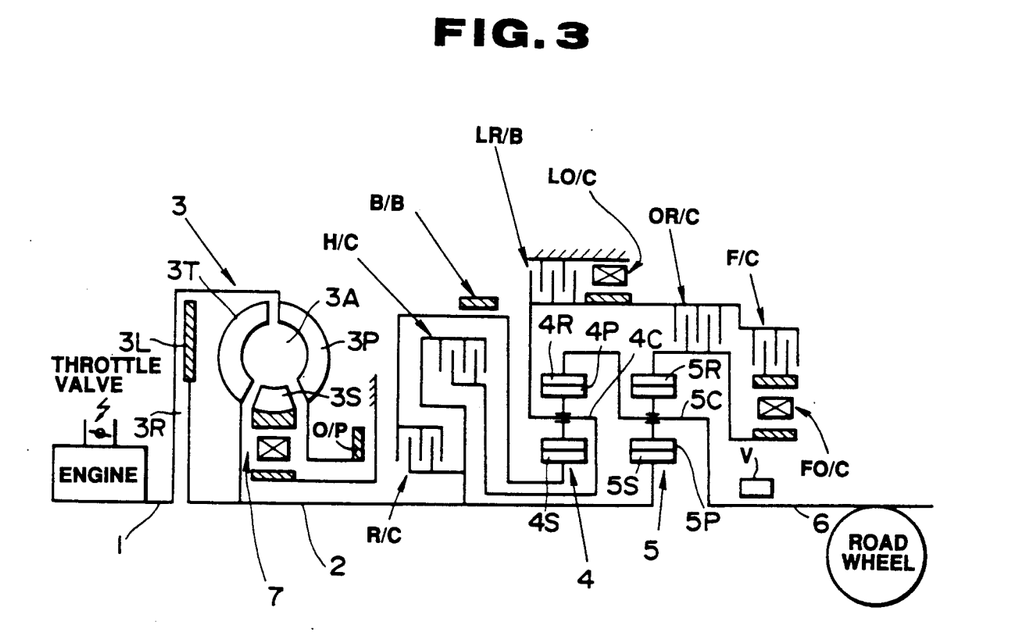
FIG. 3 is a schematic view showing in detail the gear train of the automatic transmission shown in FIG. 1.

FIG. 3 shows a schematic diagram of a gear train for the automatic transmission 24, and FIGS. 2A, 2B, and 2C when combined illustrates a hydraulic circuit of a control valve assembly for the automatic transmission 24. The detailed description along with these Figures is hereby omitted because the same is found in U.S. Pat. No. 4,680,992 issued to Hayasaki et al. on July 21, 1987, which has been hereby incorporated by reference in its entirety. Particular attention should be payed to the descriptive parts in connection with FIGS. 1A, 1B, and 1C and 2 of the U.S. Patent.

Briefly, in FIG. 3, the overrunning clutch mentioned before is denoted by the reference character OR/C, and the vehicle speed sensor by the reference character V.

Referring to FIGS. 2A, 2B, and 2C, an overrunning clutch solenoid 60, a shuttle valve 56, an overrunning clutch control valve 58, and an overruning clutch reducing valve 62 perform an engine brake control where the overrunning clutch OR/C is engaged. The overrunning clutch solenoid 60, the shuttle valve 56, and a 3-2 timing valve 48 perform a 3-2 timing control. Further, two shift solenoids 42 and 44 and two shift valves 38 and 40 perform an automatic shift control among first, second, third and fourth (overdrive) gear positions. By setting the energization and/or de-energization of the shift solenoids 42 and 44, the transmission may be conditioned in any desired gear position. For further information relating to this control, reference should be made to co-pending U.S. patent application of Yasushi NARITA Ser. No. 07/301,352 filed on Jan. 25, 1989 and assigned to the same assignee which the present application is to be assigned.

Hereinafter, the flow charts of control programs stored in memory, such as a read only memory (ROM), of a control unit are described in association with the functional diagram shown in FIG. 1.

Figure 4A:
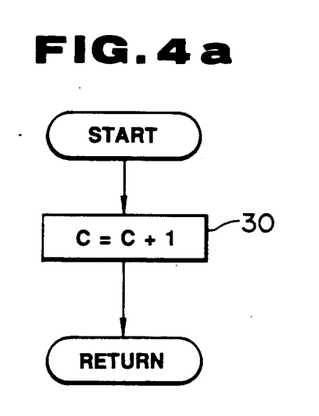
FIG. 4a is a flow chart of a program for counting a pulse generated by a vehicle speed sensor.
Figure 4B:
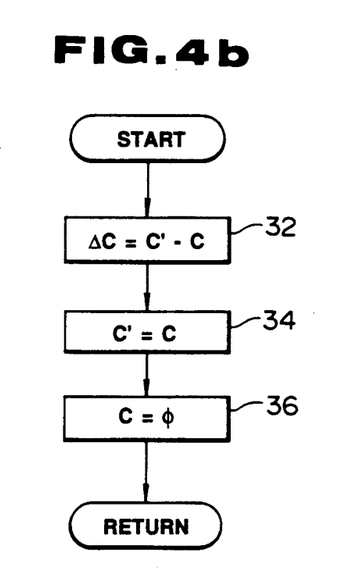

Referring to FIGS. 4a and 4b, the deceleration detecting block 14 is further described. This block has a counter C which counts occurrences of pulse signal from the vehicle speed sensor. The execution of a program as shown by the flow chart in FIG. 4a is initiated by interruption occurring in synchronous with the occurrence of pulse signal from the vehicle speed sensor. At a step 30, the content of the counter C is increased by one. The execution of a program as illustrated in a flow chart in FIG. 4b is initiated upon expiration of a predetermined period of time for example 100 ms or 354 ms. At a step 32, a difference ΔC (delta C) is calculated by subtracting C from C', where C represents the present content of the counter, while C' the previous content of the counter given the predetermined period of time ago. At a step 34, C' is updated and set equal to C. Then, at a step 36, C is cleared and set equal to 0 (zero). The difference ΔC (delta C) is proportional to the magnitude deceleration which the vehicle is subject to and thus used as the deceleration indicative signal. Of course, the deceleration indicative signal may directly be given by the vehicle mount deceleration sensor (or an accelerometer).

Figure 5:
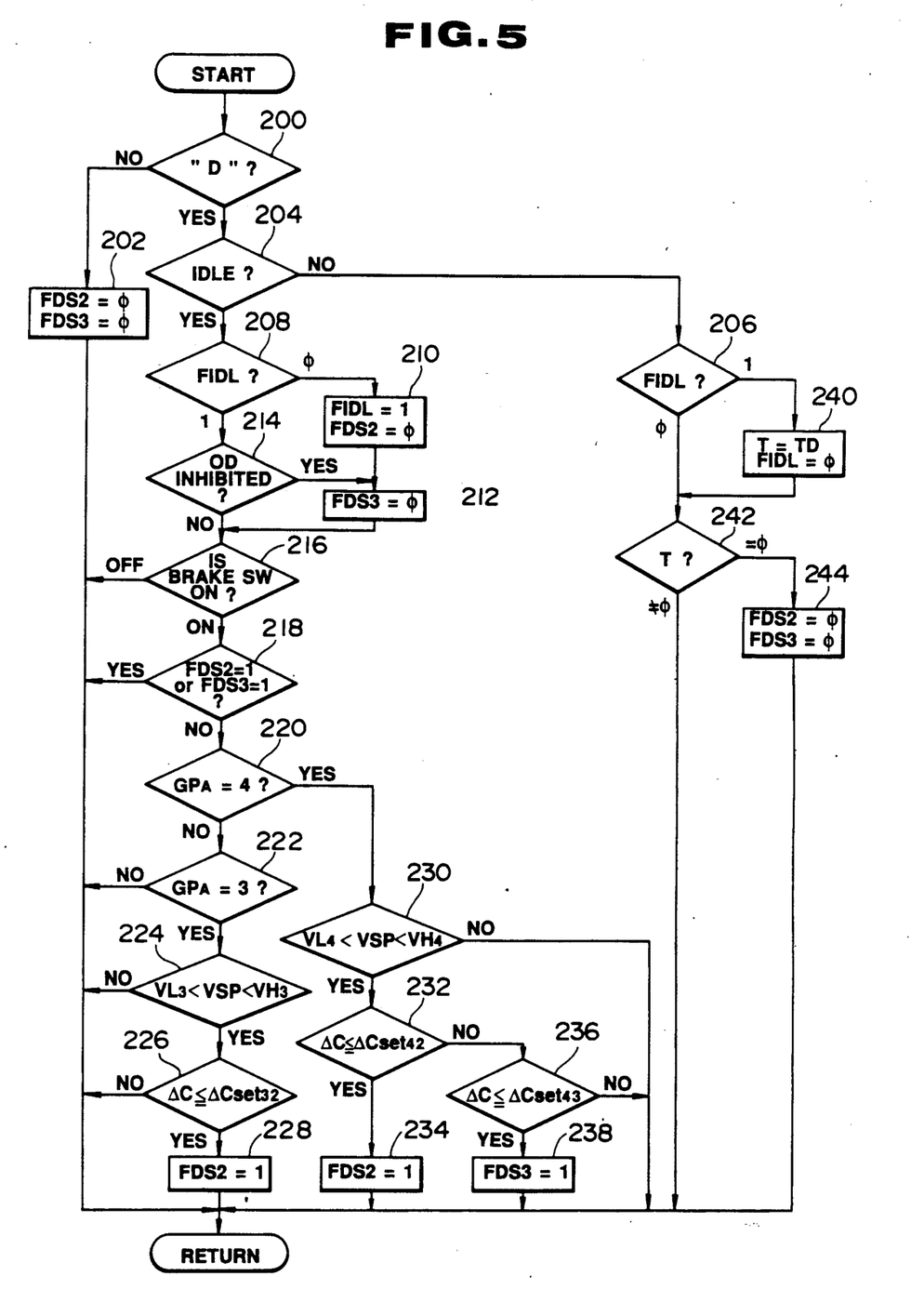

Referring to the flow chart shown in FIG. 5, the function assigned to the block 20 is described.

According to the steps of this routine, the overruning clutch OR/C is kept released during running with the third gear position when the OD inhibitor switch is pressed. This is done by resetting a downshift flag FDS3 to 0 when it is determined that the OD switch is pressed. Thus, the automatic engine brake running control which otherwise would cause engine brake running status during operation with third gear position is prohibited. Besides, according to the steps of this routine, both of the downshift flags FDS2 and FDS3 are reset to 0 when it is determined that "D" range position is not selected by the selector. Thus, the overruning clutch OR/C is kept released during operation with the second or third gear position. Thus, the automatic engine brake running control which otherwise would produce engine brake running status with the manual "2" or "1" range position selected is prohibited.

The downshift flag FDS2 also serves as a flag to inhibit upshift to third gear position upward, while the other downshift flag FDS3 serves as a flag to inhibit upshift to the fourth gear position.

In FIG. 5, at a step 200 it is determined whether the "D" range position is selected or not. If an answer to this inquiry is NO, the routine flows to a step 202 where the flags FDS2 and FDS3 are reset to 0, and ends. If the inquiry at step 200 is YES, the routine flows to a step 204 where it is determined whether the idle state is established or not by checking the status of the idle switch. If an answer to the enquiry at step 204 is NO, the routine flows to a step 206. If the enquiry at step 204 is YES, the routine flows to a step 208 where a flag FIDL is checked. If the flag FIDL is found to be 0 at the enquiry in step 208, the routine flows to a step 210 where flags FIDL is set to 1 and flag FDS2 is reset to 0, and then to a step 212 where the flag FDS3 is reset to 0. If at the enquiry in step 208 the flag FIDL is set to 1, the routine flows to a step 214 where it is determined whether the overdrive is inhibited or not by checking whether the OD switch is pressed or not. If an answer to the enquiry at step 214 is YES, the routine flows to step 212 where the flag FDS3 is reset. If an answer to the enquiry at step 214 is NO, the routine flows to a step 216 where it is determined whether the brake switch is ON or OFF. If the brake switch is OFF at the enquiry in step 216, the routine ends. If the brake switch is ON, the routine flows to a step 218 where it is determined whether at least one of the flags FDS2 and FDS3 is set to 1 or not. If an answer to the enquiry in step 218 is YES indicating that engine brake running status has been established, the routine ends. If an answer to the enquiry at step 218 is NO, the routine flows to a step 220 where it is determined whether the present or actual gear position $GP_A$ is the fourth gear position or not. If an answer to the enquiry at step 220 is NO, the routine flows to step 222 where it is determined whether $GP_A$ is the third gear position or not. If an answer to this enquiry is NO, the routine ends. If an answer to the enquiry at step 222 is YES, the routine flows to a step 224 where it is determined whether vehicle speed VSP falls in a predetermined range limited by $VL_3$ and $VH_3$. If an answer to this enquiry is NO, the routine ends. If an answer to the enquiry in step 224 is YES, the routine flows to a step 226 where ΔC (delta C) indicative of deceleration if it is negative is compared with a predetermined value ΔCset32 that is also negative. If the value ΔC is not less than or equal to ΔCset32, the routine ends. If the value ΔC is less than or equal to ΔCset32, the routine flows to a step 228 where the flag FDS2 is set to 1. If an answer to the enquiry in step 220 is YES, the routine flows to a step 230 where it is determined whether vehicle speed VSP falls in a predetermined range limited by $VL_4$ and $VH_4$. If an answer to the enquiry at step 230 is NO, the routine ends. If an answer to this enquiry is YES, the routine flows to a step 232 where it is determined whether ΔC (deceleration) is less than or equal to a predetermined value ΔCset42. If an answer to this enquiry is YES, the routine proceeds to a step 234 where the flag FDS2 is set to 1. If an answer to the enquiry at step 232 is NO, the routine flows to a step 236 where it is determined whether the value ΔC is less than or equal to ΔCset43. If an answer to this enquiry is NO, the routine ends. If an answer to the enquiry at step 236 is YES, the routine flows to a step 238 where the flag FDS3 is set to 1. The setting is such that ΔCset42 is less than ΔCset43 which in turn is less than ΔCset32.

Referring back to step 206, it is determined at this step whether the flag FIDL is set to 1 or 0. If FIDL=1 indicating that there is a shift from idle ON status to idle OFF status, a delay $T_D$ is set as timer T and the flag FIDL is reset to 0, and the routine flow to a step 242. If the flag FIDL is 0 at step 206, the routine flow to the step 242. At step 242, it is determined whether the timer T is 0 or not. If the timer T is not 0, the routine ends. If the timer T is 0, the routine flow to a step where the flags FDS2 and FDS3 are reset to 0.

Figure 6:
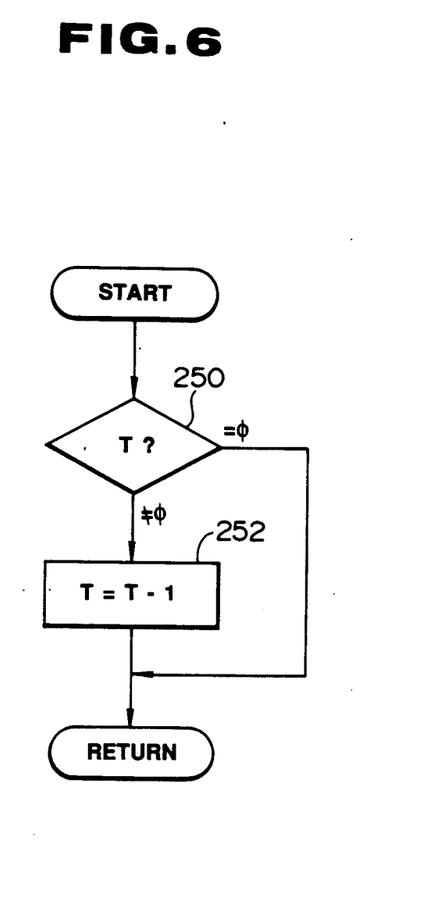
FIG. 6 is a flow chart of a program for decrement of a timer.

The decrement of the timer T is performed along with a program as illustrated by the flow chart shown in FIG. 6 which is executed upon expiration of a predetermined period of time, for example 10 ms. In FIG. 6, at a step 250 it is determined whether the content of the timer T is 0 or not. When it is determined that the content of the timer is not 0, the program proceeds to a step 252 where the content of timer T is decreased by 1 (one).

Figure 7:
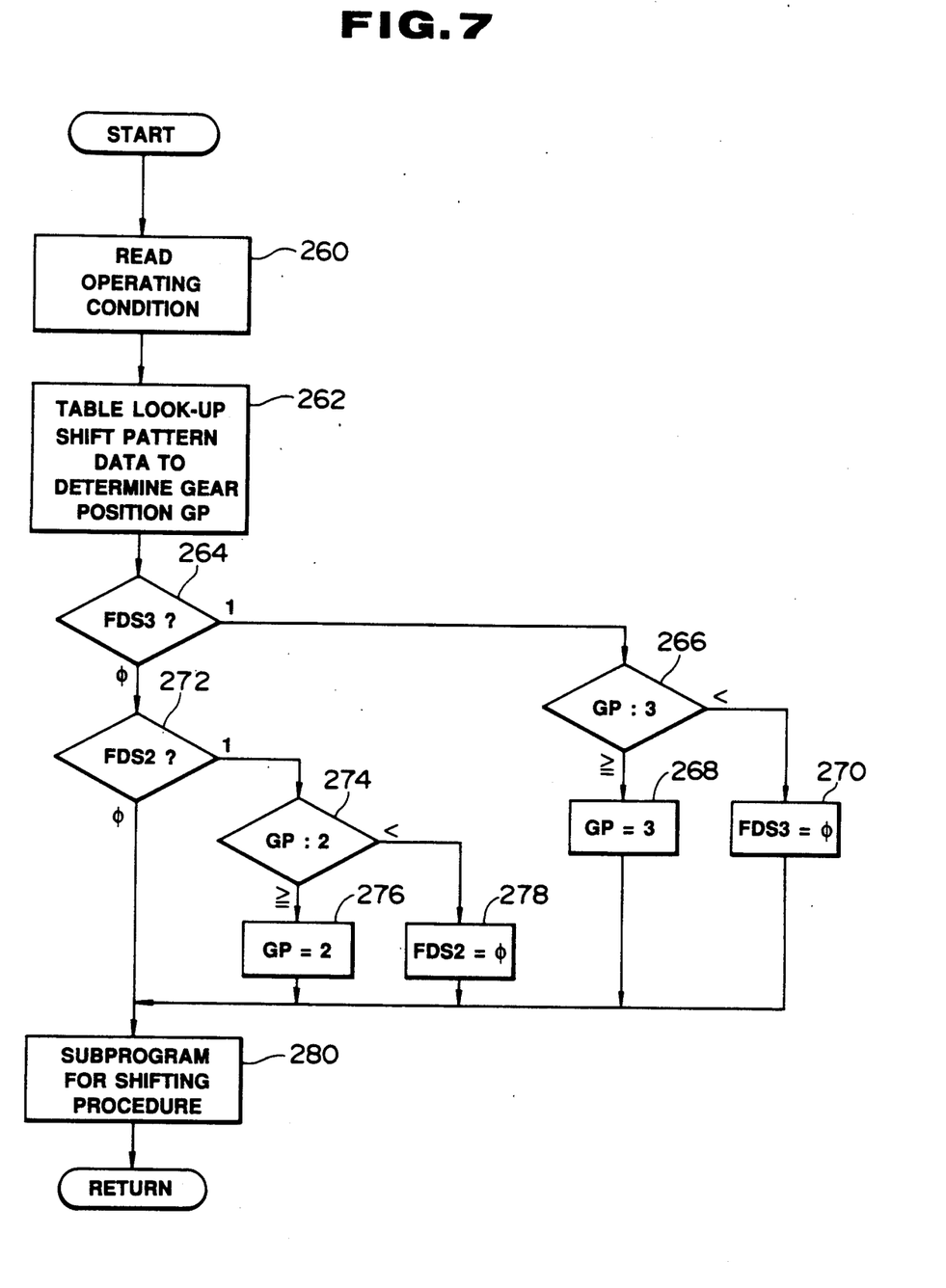
FIG. 7 is a flow chart of a program for determining a new gear position which the automatic transmission should be conditioned in after comparing a gear position obtained by retrieving a shift pattern with a gear position indicated by the downshift flag set by the flow chart shown in FIG. 5.
Figure 8:
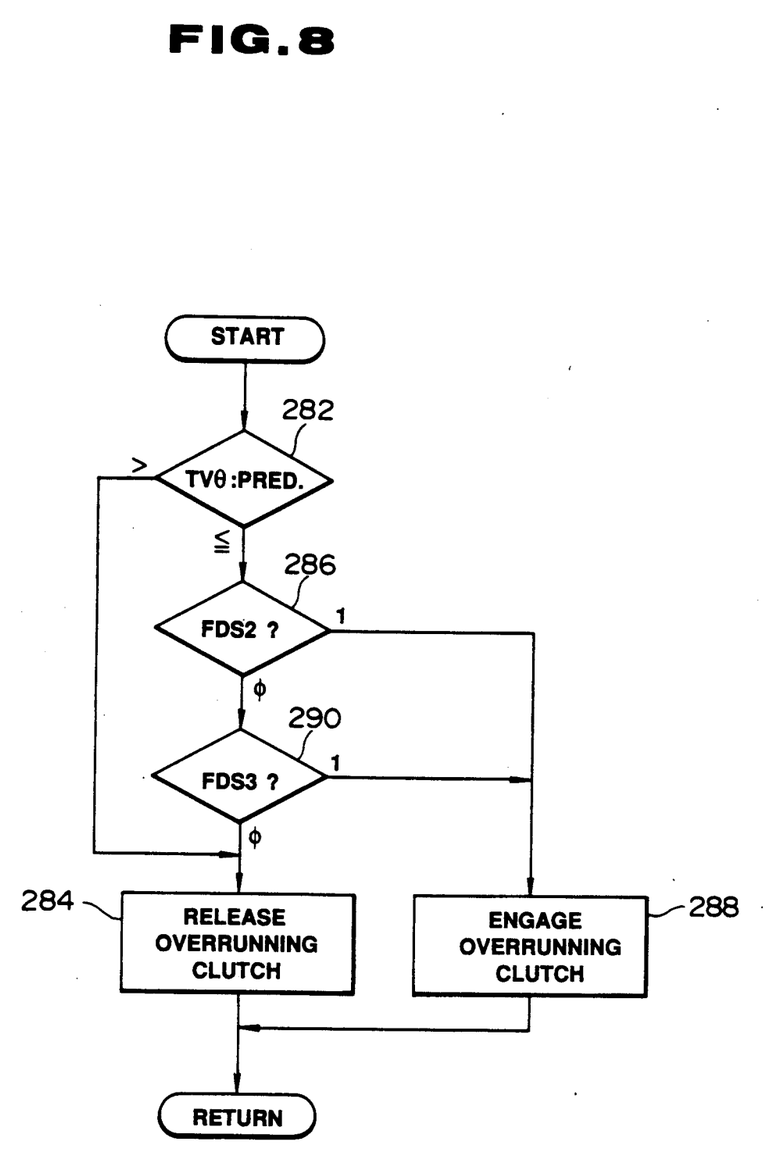
FIG. 8 is a flow chart of a program for controlling an overrunning clutch which when engaged establishes engine brake running status.

Referring to FIGS. 7 and 8, the functions assigned to the blocks 21 and 22 are described.

In FIG. 7, reading operation is performed at step 26 to store TVθ (throttle opening degree) and VSP (vehicle speed) or the like. At step 262, using TVθ and VSP stored, an appropriate shift pattern table is selected and looked up to determine a desired gear position GP. Then the routine flows to a step 264 where it is determined whether the flag FDS3 is 1 or not. If an answer to this enquiry is YES (FDS=1), the routine flows to a step 266 where it is determined whether GP is greater than or equal to 3 (third gear position) or not. If GP is greater than or equal to 3, the routine flows to a step 268 where GP is set to 3. If GP is less than 3, the routine flows to a step 270 where the flag FDS3 is set to 0. If an answer to the enquiry at step 264 is NO (FDS3=0), the routine flows to a step 272 where it is determined whether the flag FDS2 is set to 1 or not. If an answer to this enquiry is YES (FDS2=1), the routine flows to 274 where it is determined whether GP is greater than or equal to 2. If an answer to this enquiry is YES, the routine flows to a step 276 where GP is set to 2. If an answer to the enquiry at step 274 is NO, the routine flows to a step 278 where the flag FDS2 is set to 0. After the step 272 or 276 or 278 or 268 or 270 where GP is determined, the routine flows to a step 280 where signals for controlling the shift solenoids are determined whereby GP$_A$ (actual gear position) becomes equal to GP (desired gear position).

Referring to FIG. 8, at step 282 it is determined whether TV$\theta$ is less than or equal to a predetermined value. If an answer of this enquiry is NO, the routine flows to a step 284 where the overrunning clutch OR/C is released. If an answer to the enquiry at step 282 is YES, the routine flows to a step 286 where it is determined whether the flag FDS2 is 1 or not. If an answer to this enquiry is YES, the routine flows to a step 288 where the overrunning clutch OR/C is engaged to produce engine brake running status. If an answer to the enquiry at step 286 is NO, the routine flows to a step 290 where it is determined whether the flag FDS3 is equal to 1 or not. If an answer to this enquiry is 1, the routine blows to step 288. If an answer to the enquiry at step 290 is NO, the routine flows to step 284. From this description, it will be understood that the overrunning clutch OR/C is engaged to produce engine brake running status if at least one of the flags FDS2 and FDS3 is 1. If both of them is 0, the engine brake running status is released.

What is claimed is:

1. In an automatic transmission for an automotive vehicle, a shift control comprising:
   means for detecting a present gear position which the automatic transmission is conditioned in;
   control means for determining a magnitude of deceleration which the automotive vehicle is subject to, determining a predetermined deceleration value in response to said present gear position detected, comparing said magnitude of deceleration determined with said predetermined value, and determining a new gear position which the automatic transmission should be conditioned in, in response to a result from said comparing said magnitude of deceleration determined with said selected predetermined value; and
   means for effecting a downshift in the automatic transmission from said present gear position down to said new gear position.

2. In an automatic transmission as claimed in claim 1, wherein said control means further comprises a speed detecting means for generating a speed indicative signal and a deceleration detecting means for generating a deceleration indicative signal for determining said magnitude of deceleration.

3. In an automatic transmission as claimed in claim 2, wherein said deceleration detecting means calculates a derivative of the speed indicative signal from said speed detecting means during a predetermined period of time, for output as the deceleration indicative signal.

4. In an automatic transmission as claimed in claim 1, wherein said magnitude of deceleration is determined by deceleration detecting means mounted on a vehicle to detect a longitudinal deceleration of said vehicle.

5. In an automatic transmission for an automotive vehicle, the automatic transmission being shiftable for a predetermined gear position down to an adjacent low gear position or down to a still lower gear position lower than the adjacent low gear position, a shift control comprising:
   means for detecting a present gear position which the automatic transmission is conditioned in;
   means for determining a magnitude of deceleration which the automotive vehicle is subject to, determining a first predetermined value and a second predetermined value that is less than said first predetermined value when said present gear position detected indicates a predetermined gear position, comparing said deceleration determined with said at least one of said first and second selected predetermined values, and setting as a new gear position which the automatic transmission should be conditioned in the still lower gear position when said present gear position detected indicates the predetermined gear position and said magnitude of deceleration determined is greater than or equal to said first predetermined value, said setting means being operative to set as said new gear position the adjacent low gear position when said present gear position detected indicates the predetermined gear position and said magnitude of deceleration determined is less than said first predetermined value but greater than or equal to said second predetermined value; and
   means for effecting a downshift in the automatic transmission from the predetermined gear position down to said new gear position.

6. In an automatic transmission for an automotive vehicle, a shift control comprising:
   means for determining a magnitude of deceleration which the vehicle is subject to and generating a deceleration indicative signal indicative of the magnitude of deceleration detected;
   means for detecting a present gear position which the automatic transmission is conditioned in and generating a gear position indicative signal indicative of the gear position detected;
   means for determining a predetermined value in response to said gear position indicative signal, comparing said deceleration indicative signal with said selected predetermined value, and determining a new gear position which the automatic transmission should be conditioned in, in response to a result from said comparing said deceleration indicative signal with said predetermined value, said new gear position providing a gear ratio lower than a gear ratio provided by said present gear position; and
   means for shifting the automatic transmission from said present gear position down to said to said new gear position.

7. In an automatic transmission for an automotive vehicle, a method of controlling a shift in gear position in the automatic transmission, comprising the steps of:
   detecting a present gear position which the automotive vehicle is conditioned in;
   determining a magnitude of deceleration which the automotive vehicle is subject to;
   determining a predetermined value in response to said present gear position detected;
   comparing said magnitude of deceleration determined with said selected predetermined value, and determining a new gear position which the automatic transmission should be conditioned in, in response to result from said comparing step; and effecting a downshift in the automatic transmission from said present gear position down to said new gear position.

8. In an automatic transmission for an automotive vehicle, the automatic transmission being shiftable from a predetermined gear position down to an adjacent low gear position or down to a still lower gear position lower than the adjacent low gear position, a method of controlling shift in gear position in the automatic transmission, comprising the steps of :

detecting a present gear position which the automotive vehicle is conditioned in;

determining a magnitude of deceleration which the automotive vehicle is subject to;

determining a first predetermined value and a second predetermined value that is less than said first predetermined value when said present gear position detected indicates a predetermined gear position;

comparing said magnitude of deceleration determined with said at least one of said first and second selected predetermined values;

setting as a new gear position which the automatic transmission should be conditioned in the still lower gear position when said present gear position indicative signal indicates the predetermined gear position and said magnitude of deceleration detemined is greater than or equal to said first predetermined value;

setting as said new gear position the adjacent low gear position when said present gear position detected indicates the predetermined gear position and said magnitude of deceleration determined is less than said first predetermined value but greater than or equal to said second predetermined value that is less than said first predetermined value; and effecting a downshift in the automatic transmission from the predetermined gear position down to said new gear position.

9. In an automatic transmission for an automotive vehicle, a method of controlling a shift in gear position in the automatic transmission, comprising the steps of:

determining a magnitude of deceleration which the vehicle is subject to and generating a deceleration indicative signal indicative of the magnitude of deceleration detected;

detecting a present gear position which the automatic transmission is conditioned in and generating a gear position indicative signal indicative of the gear position detected;

determining predetermined value in response to said gear position indicative signal;

comparing said deceleration indicative signal with said selected predetermined value;

determining a new gear position which the automatic transmission should be conditioned in, in response to results from said comparing step, said new gear position providing a gear ration lower than a gear ratio provided by said present gear position; and shifting the automatic transmission from said present gear position down to said new gear position.

* * * * *

UNITED STATES PATENT AND TRADEMARK OFFICE
CERTIFICATE OF CORRECTION

PATENT NO.  : 5,054,336

DATED       : Oct. 8, 1991

INVENTOR(S) : Satoshi TAKIZAWA

It is certified that error appears in the above-identified patent and that said Letters Patent is hereby corrected as shown below:

On the title page:

The following information should appear after the conclusion of item [73]

--[*]  The portion of the term of this patent subsequent to May 21, 2008 has been disclaimed.--

Signed and Sealed this

Eighth Day of February, 1994

Attest:

BRUCE LEHMAN

Attesting Officer

Commissioner of Patents and Trademarks